United States Patent
Jeng et al.

(10) Patent No.: US 12,425,683 B2
(45) Date of Patent: Sep. 23, 2025

(54) CLOCK CONTROL METHOD AND ELECTRONIC DEVICE THEREOF

(71) Applicant: MEDIATEK INC., Hsinchu (TW)

(72) Inventors: You-Tsai Jeng, Hsinchu (TW);
Yi-Cheng Chen, Hsinchu (TW);
Kuo-Chang Cheng, Hsinchu (TW);
Kai-Wen Yeh, Hsinchu (TW);
Chih-Wei Chou, Hsinchu (TW);
Chia-Hao Chang, Hsinchu (TW);
Chi-Chih Chen, Hsinchu (TW);
Yu-Sung Chang, Hsinchu (TW);
Chin-Lung Lin, Hsinchu (TW);
Ko-Yin Lai, Hsinchu (TW); Tai-Lai Tung, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 15 days.

(21) Appl. No.: 18/336,274

(22) Filed: Jun. 16, 2023

(65) Prior Publication Data
US 2024/0422382 A1      Dec. 19, 2024

(51) Int. Cl.
*H04N 21/4363*      (2011.01)
(52) U.S. Cl.
CPC .............................. *H04N 21/43635* (2013.01)
(58) Field of Classification Search
CPC .............................................. H04N 21/43635
See application file for complete search history.

(56) References Cited

U.S. PATENT DOCUMENTS

| 7,797,561 B1* | 9/2010 | Abdalla | G06F 1/3287 |
| | | | 713/322 |
| 11,205,401 B1* | 12/2021 | Jeng | G09G 5/12 |
| 11,412,302 B2 | 8/2022 | Chan | |
| 11,537,533 B2 | 12/2022 | Litichever | |
| 2008/0100597 A1* | 5/2008 | Quan | H04N 5/913 |
| | | | 348/E17.005 |
| 2018/0070042 A1 | 3/2018 | Kim | |
| 2019/0172413 A1 | 6/2019 | Park | |
| 2020/0313883 A1 | 10/2020 | Huang | |

(Continued)

FOREIGN PATENT DOCUMENTS

| TW | I792742 B | 2/2023 | |
| WO | WO-2022211098 A1 * | 10/2022 | G06F 1/3237 |

OTHER PUBLICATIONS

English Translation of WO-2022211098-A1 (Year: 2022).*

(Continued)

*Primary Examiner* — Kyu Chae
(74) *Attorney, Agent, or Firm* — McClure, Qualey & Rodack, LLP (57) ABSTRACT

A clock control method for a High Definition Multimedia Interface (HDMI) receiver operating in a power-saving mode in a sink device is provided. The HDMI receiver has a first module, a second module, and a third module. The clock control method includes the following stages. A clock signal is enabled to be sent to the first module and the third module during a first region of received data. The clock signal is disabled to be sent to the second module during the first region of the received data. The clock signal is enabled to be sent to the third module and the clock signal is disabled to be sent to the first module and the second module during a second region of the received data.

14 Claims, 4 Drawing Sheets

(56) References Cited

U.S. PATENT DOCUMENTS

2022/0109500 A1\* 4/2022 Bai .................... H04B 10/806
2024/0184349 A1\* 6/2024 Ma ..................... H01L 21/822

OTHER PUBLICATIONS

English Translation of WO-2022211098 (Year: 2022).\*
WO-2022211098 (Year: 2022).\*
Extended European Search Report dated Mar. 21, 2024, issued in application No. EP 23204107.9.
Chinese language office action dated Aug. 23, 2024, issued in application No. TW 113101692.

\* cited by examiner

CLOCK CONTROL METHOD AND ELECTRONIC DEVICE THEREOF

BACKGROUND OF THE INVENTION

Field of the Invention

The present invention relates to a clock control method, and, in particular, to a clock control method for High Definition Multimedia Interface (HDMI) receiver in a sink device.

Description of the Related Art

A fast switch function between different HDMI ports is required in the HDMI application. Because of the High-Bandwidth Digital Content Protection (HDCP) encryption, the sink device should synchronize with the source HDCP status of a source device. The HDCP encryption status is based on the frame counter and AVMUTE control. The frame counter and the AVMUTE control rely on the signals transmitted through the HDMI lanes.

However, turning on all HDMI ports to synchronize all the HDMI lanes signal results in high power consumption.

BRIEF SUMMARY OF THE INVENTION

An embodiment of the present invention provides a clock control method for a High Definition Multimedia Interface (HDMI) receiver operating in a power-saving mode in a sink device. The HDMI receiver has a first module, a second module, and a third module. The clock control method includes the following stages. A clock signal is enabled to be sent to the first module and the third module during a first region of received data. The clock signal is disabled to be sent to the second module during the first region of the received data. The clock signal is enabled to be sent to the third module and the clock signal is disabled to be sent to the first module and the second module during a second region of the received data.

According to the clock control method described above, the first region of the received data is a power-on region of a frame. The second region of the received data is a power-off region of the frame. The power-on region is a set of lines containing HDCP information of the frame, and the power-off region is the remaining lines not containing the HDCP information of the frame.

According to the clock control method described above, the third module includes a power switch controller and a synchronization module.

According to the clock control method described above, the first module includes a decoder, a timing detector, and a HDCP encryption detector According to the clock control method described above, the second module comprises a HDCP cipher related module and an audio related module.

According to the clock control method described above, the synchronization module maintains synchronization between the sink device and the source device.

According to the clock control method described above, the HDCP information comprises AVMUTE control information and HDCP control information.

According to the clock control method described above, the clock signal is a Fixed Rate Link (FRL) clock or a Transition Minimized Differential Signaling (TMDS) clock.

An embodiment of the present invention also provides an electronic device. The electronic device includes a first plurality of circuits, a second plurality of circuits, a plurality of clock switches, and a controller. Each of the clock switches is electrically connected to the first module and the second module, and receives a clock signal. The controller is electrically connected to the clock switches, and sends an enable signal or a disable signal to the clock switches. The controller enables the clock switches through the enable signal to send the clock signal to the first plurality of circuits. The controller disables the clock switches through the disable signal so that the clock signal is not sent to the second plurality of circuits when the clock signal is enabled to be sent to the first plurality of circuits.

According to the electronic device described above, the controller receives data having a power-on region and a power-off region in a frame from a source device. The power-on region is a set of lines containing HDCP information of the frame, and the power-off region is the remaining lines not containing the HDCP information of the frame.

According to the electronic device described above, the first plurality of circuits include a power switch controller, a synchronization module, a decoder, a timing detector, HDCP encryption detector modules and a power switch controller when the first region of each frame is received. The second plurality of circuits include a HDCP cipher related module and an audio related module when the first region of each frame is received.

According to the electronic device described above, the first plurality of circuits include a power switch controller and a synchronization module when the second region of each frame is received. The second plurality of circuits include a decoder, a timing detector, HDCP encryption detector modules, a power switch controller, and a synchronization module when the second region of each frame is received.

According to the electronic device described above, the synchronization module maintains synchronization between the electronic device and the source device.

According to the electronic device described above, the HDCP information includes AVMUTE control information and HDCP control information.

According to the electronic device described above, the clock signal is a Fixed Rate Link (FRL) clock or a Transition Minimized Differential Signaling (TMDS) clock.

According to the electronic device described above, the electronic device is an HDMI receiver in a sink device.

According to the electronic device described above, the first region is a power-on region and the second region is a power-off region in the frame from the source device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the above purposes, features, and advantages of some embodiments of the present invention more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present invention. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

Figure 1:
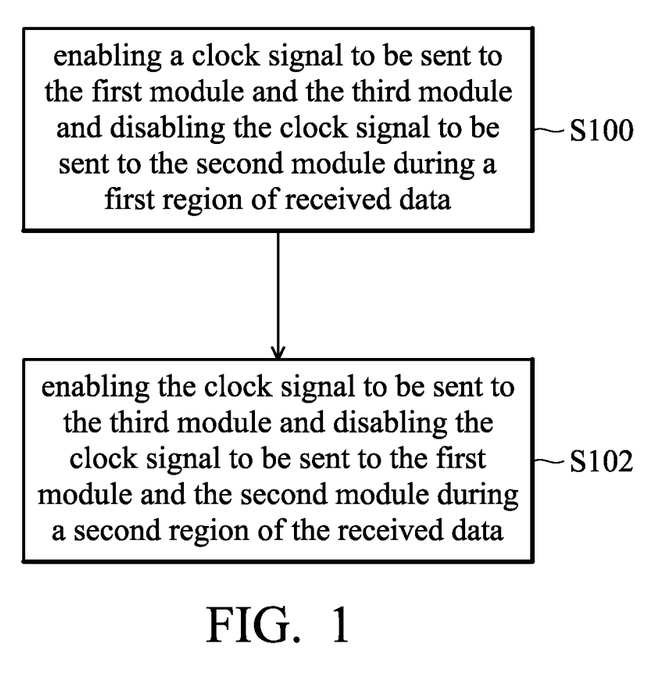
FIG. 1 is a flow chart of a clock control method for a High Definition Multimedia Interface (HDMI) receiver operating in a power-saving mode in accordance with some embodiments of the present invention.

FIG. 1 is a flow chart of a clock control method for an HDMI receiver operating in a power-saving mode in accordance with some embodiments of the present invention. The HDMI receiver has a first module, a second module, and a third module. The HDMI receiver is in a sink device. As shown in FIG. 1, the clock control method for the HDMI receiver includes the following stages. A clock signal is enabled to be sent to the first module and the third module, and the clock signal is disabled to be sent to the second module during a first region of received data (step S100). The clock signal is enabled to be sent to the third module and the clock signal is disabled to be sent to the first module and the second module during a second region of the received data (step S102). In some embodiments, in step S100, the clock signal is enabled to be sent to the first module and the third module through an enable signal, and the clock signal is disabled to be sent to the second module through a disable signal, but the present invention is not limited thereto. In some embodiments, the enable signal and the disable signal are from a controller, but the present invention is not limited thereto.

In some embodiments, the clock control method of the present invention further receives data having a first region and a second region in a frame from a source device. In some embodiments, the data have the HDMI frame structure. The first region is a set of (data) lines containing HDCP information of the frame, and the second region is the remaining (data) lines not containing the HDCP information of the frame.

When the sink device enters the power saving mode, the HDCP information in the first region is still required for the sink device for decrypting the encrypted data from the source device to achieve the quick switching across the different HDMI ports. Therefore, the HDMI receiver has to power on when the first region of the data from the source device is received. That is, the first region is the power-on region for the HDMI receiver of the HDMI sink device when it's under the power-saving mode.

On the other hand, the second region of the frame from the source device doesn't include the HDCP information which is required for decryption. Therefore, the HDMI receiver has to power off during the second region of the received data from the source device. That is, the first region is the power-on region and the second region is the power-off region for the HDMI receiver of the HDMI sink device when it's under the power-saving mode.

The HDCP information includes AVMUTE control information and HDCP control information. The detail description for the power-on region and the power-off region may be described in the following FIG. 2. In step S100, the first module includes a power switch controller and a synchronization module when the power-off region of the frame is received. In some embodiments, the power switch controller provides the power to each of the first module and the second module. Even if the first module and the second module receive the power from the power switch controller, they will not operate without receiving the clock signal. In some embodiments, the synchronization module maintains synchronization between the sink device and the source device. In step S102, the second module includes the remaining other modules except the power switch controller and the synchronization module when the power-off region of the frame is received.

In some embodiments, in step S100, the first module includes a power switch controller, a synchronization module, decoder, timing detector, and HDCP encryption detector modules when the power-on region of each frame is received. In some embodiments, the decoder module and the HDCP encryption detector module decode the encrypted data stream from the source device, so that the correct video data and audio data can be obtained by the sink device. In some embodiments, the timing detector module detects the timing, so that the clock signal can be sequentially sent to the first module based on the HDMI specification. In step S102, the second module includes the remaining other modules except the power switch controller, the synchronization module, the decoder, timing detector, and HDCP encryption detector modules when the power-on region of each frame is received. In some embodiments, the clock signal in steps S100 and S102 is a Fixed Rate Link (FRL) clock or a Transition Minimized Differential Signaling (TMDS) clock, but the present invention is not limited thereto.

Figure 2:
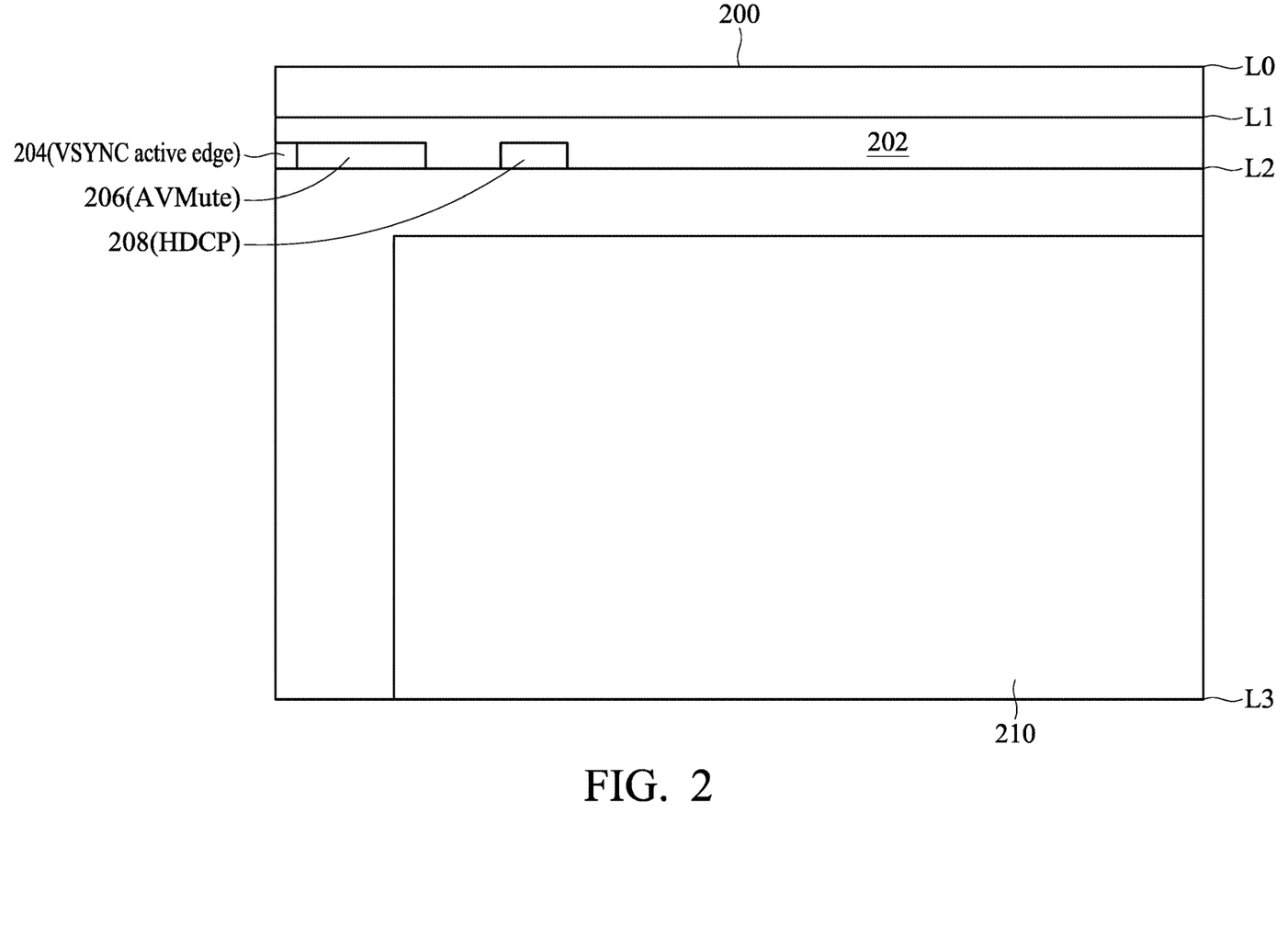
FIG. 2 is a schematic diagram of a frame structure in accordance with some embodiments of the present invention.

FIG. 2 is a schematic diagram of a frame structure in accordance with some embodiments of the present invention. As shown in FIG. 2, the frame 200 includes a power-on region 202 located between the data line L1 and the data line L2, and a power-off region located between the data lines L0 and L1, and between the data lines L2 and L3. In some embodiments, the frame 200 in FIG. 2 is the frame when the sink device is in a power-saving mode. That is, when the sink device is in the power-saving mode, the power-on region 202 containing HDCP information of the frame 200 is present between the data line L1 and the data line L2, and the power-off region is the remaining lines not containing the HDCP information of the frame, such as between the data lines L0 and L1, and between the data lines L2 and L3. In some embodiments, the frame 200 also includes video data 210. However, when the sink device is in the power-saving mode, since the video data 210 are within the power-off region, the video data 210 will be neglected. In some embodiments, the power-on region 202 includes a sub-region 204, a sub-region 206, and a sub-region 208. The sub-region 204 includes a VSYNC active edge. In some embodiments, the power is turned on a few pixels time before the VSYNC active edge in the sub-region 204 for clock synchronization.

The sub-region 206 and the sub-region 208 contains the HDCP information of the frame 200. The sub-region 206 includes AVMUTE control information. The sub-region 208 includes HDCP control information. In some embodiments, the power is turned on one line period, such as the period when the data line L2 is turned on, after the VSYNC active edge for observing the HDCP information including the AVMUTE control information and the HDCP control information. In some embodiments, the power is turned off for the other time for the power-saving mode. In some embodiments, according to the HDMI specification, the AVMUTE control information in the sub-region 206 is transmitted between the VSYNC active edge in sub-region 204 and 384 pixels following the VSYNC active edge.

According to the HDCP specification, the HDCP control information is transmitted between the 512 pixels and 528 pixels following the VSYNC active edge. In some embodiments, the data length of the AVMUTE control information is 32 pixels. The data length of the HDCP control information is 16 pixels. In some embodiments, when the sink device is in a normal mode, the frame 200 will include the power-on region, but exclude the power-off region. That is, the power-on region in the normal mode may be located between the data line L0 to the data line L3, but the present invention is not limited thereto.

Figure 3:
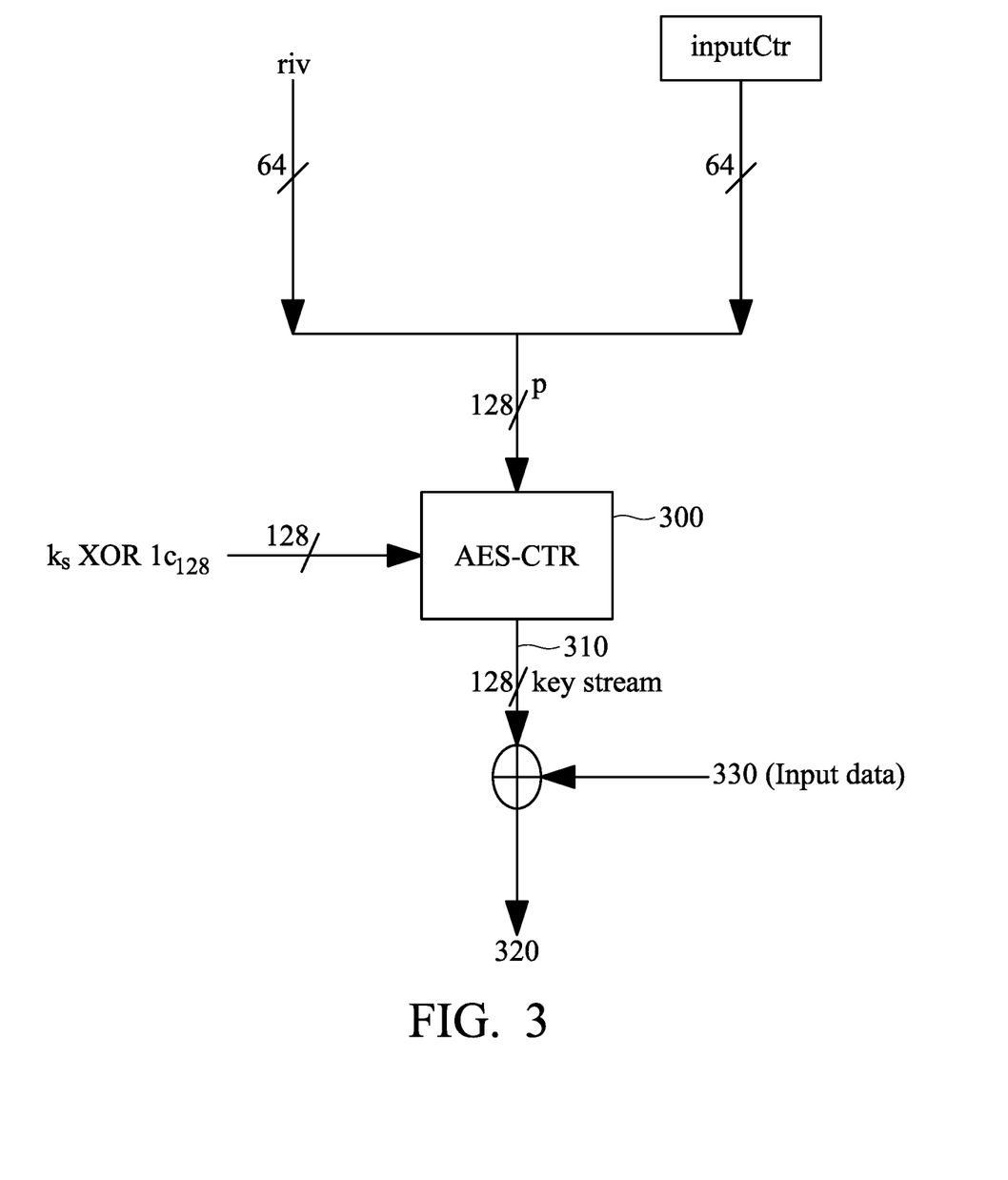
FIG. 3 is a schematic diagram of a High-Bandwidth Digital Content Protection (HDCP) encryption in accordance with some embodiments of the present invention.

FIG. 3 is a schematic diagram of a High-Bandwidth Digital Content Protection (HDCP) encryption in accordance with some embodiments of the present invention. As shown in FIG. 3, when the HDCP encryption is performed, a source or sink device of the present invention unites a parameter stream riv and a count number inputCtr to obtain a combined stream p. For example, the data size of the parameter stream riv is 64 bits, the data size of the count number inputCtr is 64 bits, so that the data size of the combined stream p is 128 bits. Then, the source or sink device of the present invention inputs the combined stream p into an advance encryption standard (AES) algorithm 300 operating in a CTR mode (marked as AES-CTR in FIG. 3). The present invention does not limit the algorithm herein. Furthermore, the source or sink device of the present invention also performs XOR operation on a parameter stream Ks and a parameter stream $lc_{128}$ to get a calculation result, and inputs the calculation result into the AES algorithm 300. Next, the source or sink device of the present invention performs encryption on the combined stream p and the calculation result to obtain a key stream 310.

In some embodiments, the data size of the calculation result is 128 bits, and the data size of the key stream 310 is also 128 bits, but the present invention is not limited thereto. Then, the clock control method of the present invention executes the XOR operation for the key stream 310 and the input data 330 to obtain an encrypted stream 320. In some embodiments the input data 330 may be the video 210 in FIG. 2, but the present invention is not limited thereto. In some embodiments, the source device sends the encrypted stream 320 to the sink device of the present invention through an HDMI cable. After that, the sink device in both the normal mode and the power-saving mode decodes the encrypted stream 320 based on the AVMUTE control information and the HDCP control information received in the frame 200 in FIG. 2. In some embodiments, the parameter streams riv, Ks, and lc128 are determined after the sink device boots up. Therefore, if the sink device in the power-saving mode can synchronize the input count inputCtr from the source device by HDCP control information in the frame 200, the sink device is able to decode the encrypted stream 320 to obtain the input data 330.

In detail, the input count inputCtr is sensed by a 64-bit counter. The 64-bit counter includes 38-bit frame number and 26-bit data number. The frame number is increased by one when the enable signal for HDCP encryption (such as the enable signal ENC_EN) is received since the start of the HDCP encryption. The data number is increased by one following the generation of every 128-bit key stream 310. In some embodiments, the frame number must not be reset at any other time. The data number should be reset when every enable signal ENC_EN is received. In some embodiments, the input count inputCtr should not change for frames which are not encrypted. For example, the input count inputCtr may not change when the SET_AVMUTE signal of the sub-region 206 in the power-on region 202 is received, but may change when the ENC_EN signal of the sub-region 208 in the power-on region 202 is received. With the rules described above, the source device may finish the HDCP encryption to output the encrypted stream 320, and the sink device may decode the encrypted stream 320 to recover the input data 330 based on the AVMUTE control information and the HDCP control information.

Figure 4:
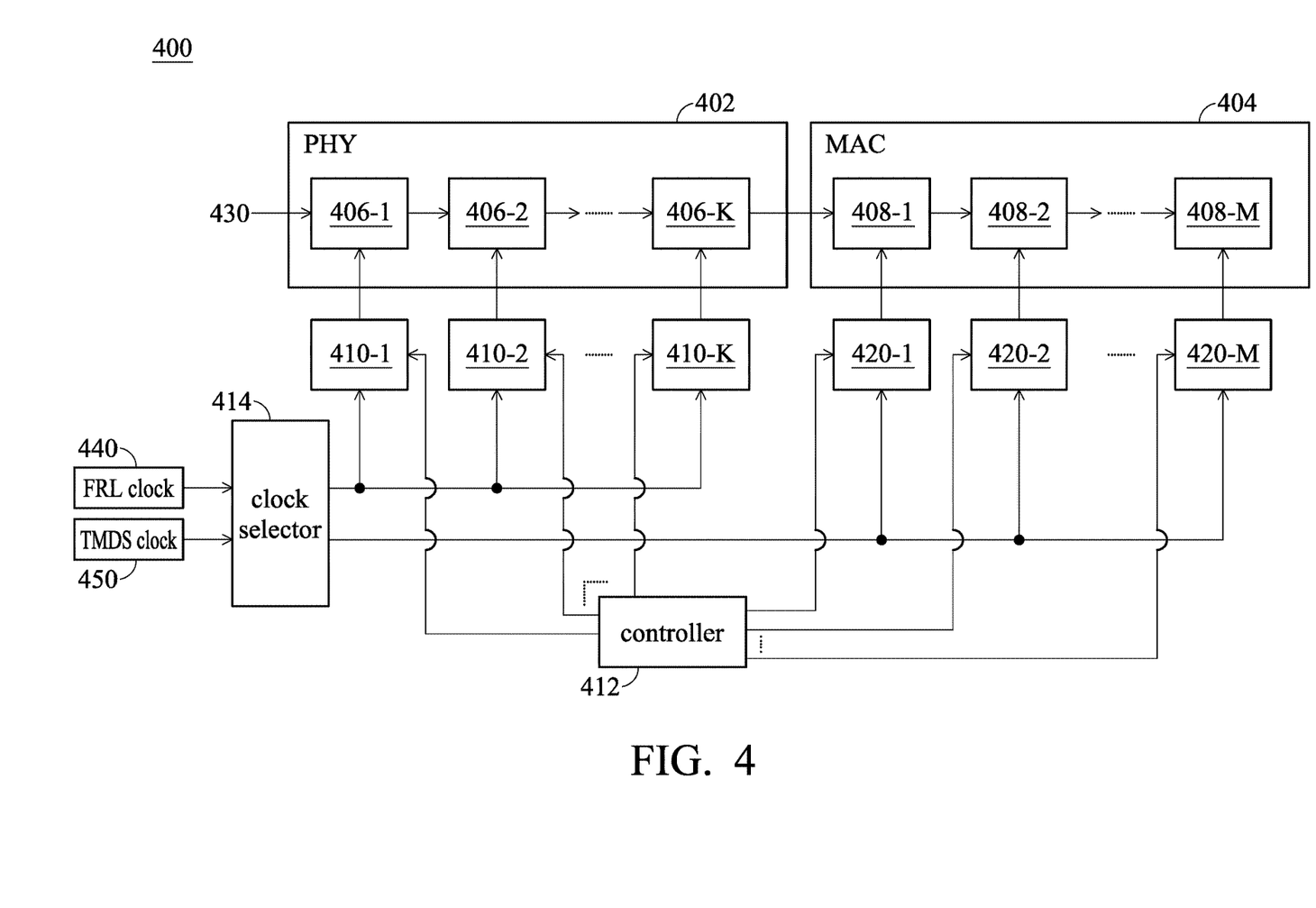
FIG. 4 is a schematic diagram of an electronic device 400 in accordance with some embodiments of the present invention.

FIG. 4 is a schematic diagram of an electronic device 400 in accordance with some embodiments of the present invention. In some embodiments, the electronic device 400 may be an HDMI receiver in a sink device, but the present invention is not limited thereto. As shown in FIG. 4, the electronic device 400 includes a physical layer (PHY) 402, a media access control layer (MAC) 404, a plurality of clock switches such as clock switches 410-1, 410-2, . . . , 410-K, clock switches 420-1, 420-2, . . . , 420-M, a controller 412, and a clock selector 414. In some embodiments, the physical layer 402 includes a plurality of function modules, such as modules 406-1, 406-2, . . . , 406-K. K is an integer larger than two. The MAC layer 404 includes a plurality of function modules, such as modules 408-1, 408-2, . . . , 408-M. M is an integer larger than two. K and M may be the same or different. In some embodiments, the modules 406-1, 406-2, . . . , 406-K in the physical layer 402 are used to perform analog-signal processing, and the modules 408-1, 408-2, . . . , 408-M in the MAC layer 404 are used to perform digital-signal processing. In some embodiments, the data 430 are input to the physical layer 402 for analog processing, and the data 430 are input to the MAC layer 404 for digital processing.

As shown in FIG. 4, the clock switch 410-1 is electrically connected to the module 406-1. The clock switch 410-2 is electrically connected to the module 406-2. The clock switch 410-K is electrically connected to the module 406-K. The clock switch 420-1 is electrically connected to the module 408-1. The clock switch 420-2 is electrically connected to the module 408-2. The clock switch 420-M is electrically connected to the module 408-M. The controller 412 is electrically connected to the clock switches 410-1, 410-2, . . . , 410-K and the clock switches 420-1, 420-2, . . . , 420-M. The clock selector 414 is also electrically connected to the clock switches 410-1, 410-2, . . . , 410-K and the clock switches 420-1, 420-2, . . . , 420-M. The clock selector 414 is electrically connected to the FRL clock 440 and the TMDS clock 450.

In some embodiments, the clock switches 410-1, 410-2, . . . , 410-K and the clock switches 420-1, 420-2, . . . , 420-M respectively receive a clock signal from the clock selector 414. The clock signal may be the FRL clock 440 or the TMDS clock 450 based on the HDMI version, such as HDMI 1.4 or HDMI 2.0, but the present invention is not limited thereto. In some embodiments, the controller 412 sends an enable signal or a disable signal to the clock switches 410-1, 410-2, . . . , 410-K and the clock switches 420-1, 420-2, . . . , 420-M to enable or disable the respective clock switches. In some embodiments, the controller 412 receives data having a power-on region and a power-off region in a frame (as shown in FIG. 2) from a source device. The power-on region is a set of lines containing HDCP information of the frame, and the power-off region is the remaining lines not containing the HDCP information of the frame. In some embodiments, when the sink device is in the power-saving mode and the power-on region of each frame is received, the controller 412 sends the enable signal to the clock switches 410-1, 410-2, . . . , 410-K and the clock switches 420-1, 420-2, . . . , 420-(M-1), so that the clock signal can be sent to the modules 406-1, 406-2, . . . , 406-K and the modules 408-1, 408-2, . . . , 408-(M-1). In contrast, the controller 412 sends the disable signal to the clock switch 420-M, so that the clock signal cannot be sent to the module 408-M. In the present embodiment, the modules 406-1, 406-2, . . . , 406-K and the modules 408-1, 408-2, . . . , 408-(M-1) which are received the clock signal during the power-on region in the power-saving mode may be a power switch controller, a synchronization module, decoder, timing detector, and HDCP encryption detector modules. The module 408-M may be HDCP cipher related modules and audio related modules. That is, when the sink device is in the power-saving mode and the power-on region of each frame is received, the power switch controller, the synchronization module, decoder, timing detector, and HDCP encryption detector modules are enabled to receive the clock signal, and the HDCP cipher related modules and audio related modules are disabled to receive the clock signal.

In the other embodiments, when the sink device is in the power-saving mode and the power-off region of the frame is received, the controller 412 sends the enable signal to the clock switch 410-2 and the clock switch 420-2, so that the clock signal can be sent to the module 406-2 in the physical layer 402 and the module 408-2 in the MAC layer 404. In contrast, the controller 412 sends the disable signal to the modules 410-1, 410-3, . . . , 410-K and the modules 420-1, 420-3, . . . , 420-M, so that the clock signal cannot be sent to the modules 406-1, 406-3, . . . , 406-K in the physical layer 402, and the clock signal cannot be sent to the modules 408-1, 408-3, . . . , 408-M. In this embodiment, the module 406-2 may be a power switch controller in the physical layer 402, and the module 408-2 may be a synchronization module in the MAC layer 404. That is, when the sink device is in the power-saving mode and the power-off region of the frame is received, most modules can be disabled except the power switch controller and the synchronization module. The synchronization module maintains synchronization between the sink device and the source device. In some embodiments, when the sink device is in a normal mode, all modules in both the physical layer 402 and the MAC layer 404 are enabled.

To be clear, the power switch controller and the synchronization module of the HDMI receiver 400 are enabled to receive the clock signal to keep the power switch function and frame counting function. The power switch controller is configured to turn on and turn off the modules 406-1, 406-2, . . . 406-K, 408-1, 408-2, . . . , 408-M in the physical layer 402 and the MAC layer 404. The synchronization module is the frame counter to continue the frame count when the received data inputting from the source device. Both the power switch function and frame counting function are essential for the HDMI sink device in the power-saving mode. In addition, the HDCP cipher related modules and audio related modules are disabled to receive the clock signal when the HDMI receiver 400 is in the power-saving mode. The clock gating status of a decoder, a timing detector, and a HDCP encryption detector of the HDMI receiver 400 operating in the power saving mode depends on the received data. If the region of the received data contains HDCP information, the decoder, the timing detector, and the HDCP encryption detector are enabled to receive the clock signal by the controller 412. Instead, if the region of the received data contains no HDCP information, the decoder, the timing detector, and the HDCP encryption detector are disabled to receive the clock signal by the controller 412.

It is assumed that a sink device includes four HDMI ports, such as port #1, port #2, port #3, and port #4. In some embodiments, the four HDMI ports are all electrically connected to respective source devices. The HDMI receiver of port #1 is initially in the normal mode. The HDMI receivers of ports #2, #3, and #4 are in the power-saving mode. When the HDMI receivers of ports #2, #3, and #4 are in the power-saving mode, each of the HDMI receivers of ports #2, #3, and #4 still receives HDCP information including AVMUTE control information and HDCP control information in the power-on region of each frame. When the HDMI receiver of port #1 turns into the power-saving mode, the HDMI receiver of port #2 turns into the normal mode, and the HDMI receivers of ports #3 and #4 remain in the power-saving mode, the HDMI receiver of port #2 can decode the encrypted stream immediately based on the HDCP information received while in the previous power-saving mode to recover the video and audio data, so that the sink device can show the video and the audio from port #1 to port #2 accordingly.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clock control method for a High Definition Multimedia Interface (HDMI) receiver operating in a power-saving mode, having a first module, a second module and a third module, in a sink device, comprising:
    enabling a clock signal to be sent to the first module and the third module and disabling the clock signal to be sent to the second module during a first region of received data; and
    enabling the clock signal to be sent to the third module and disabling the clock signal to be sent to the first module and the second module during a second region of the received data;
    wherein the first region of the received data is a power-on region of a frame, the second region of the received data is a power-off region of the frame;
    wherein the first region is a set of lines containing High Digital Content Protection (HDCP) information of the frame, and the second region is the remaining lines not containing the HDCP information of the frame.

2. The clock control method as claimed in claim 1, wherein the third module comprises a power switch controller and a synchronization module.

3. The clock control method as claimed in claim 1, wherein the first module comprises a decoder, a timing detector, and a High Digital Content Protection (HDCP) encryption detector.

4. The clock control method as claimed in claim 1, wherein the second module comprises a High Digital Content Protection (HDCP) cipher related module and audio related modules.

5. The clock control method as claimed in claim 1, wherein the second module comprises a High Digital Content Protection (HDCP) cipher related module and audio related modules.

6. The clock control method as claimed in claim 1, wherein the HDCP information comprises AVMUTE control information and High Digital Content Protection (HDCP) control information.

7. The clock control method as claimed in claim 1, wherein the clock signal is a Fixed Rate Link (FRL) clock or a Transition Minimized Differential Signaling (TMDS) clock.

8. An electronic device, comprising:
    a first plurality of circuits;
    a second plurality of circuits;
    a plurality of clock switches, each of which is electrically connected to the first module and the second module, and configured to receive a clock signal; and
    a controller, electrically connected to the clock switches, configured to send an enable signal or a disable signal to the clock switches;
    wherein the controller enables the clock switches through the enable signal to send the clock signal to the first plurality of circuits;
    wherein the controller disables the clock switches through the disable signal, so that the clock signal is not sent to the second plurality of circuits when the clock signal is enabled to be sent to the first plurality of circuits;
    wherein the controller receives data having a first region and a second region in a frame from a source device; the first region is a power-on region and the second region is a power-off region in the frame from the source device;
    wherein the first region is a set of lines containing High Digital Content Protection (HDCP) information of the frame, and the second region is the remaining lines not containing the HDCP information of the frame.

9. The electronic device as claimed in claim 8, wherein the first plurality of circuits comprises a power switch controller, a synchronization module, decoder, timing detector, High Digital Content Protection (HDCP) encryption detector modules, a power switch controller and a synchronization module and the second plurality of circuits comprises a High Digital Content Protection (HDCP) cipher related module and audio related modules when the first region of each frame is received.

10. The electronic device as claimed in claim 8, wherein the first plurality of circuits comprises a power switch controller and a synchronization module, and the second plurality of circuits comprises a decoder, a timing detector, High Digital Content Protection (HDCP) encryption detector modules, a power switch controller and a synchronization module when the second region of each frame is received.

11. The electronic device as claimed in claim 9, wherein the synchronization module maintains synchronization between the electronic device and the source device.

12. The electronic device as claimed in claim 8, wherein the HDCP information comprises AVMUTE control information and High Digital Content Protection (HDCP) control information.

13. The electronic device as claimed in claim 8, wherein the clock signal is a Fixed Rate Link (FRL) clock or a Transition Minimized Differential Signaling (TMDS) clock.

14. The electronic device as claimed in claim 8, wherein the electronic device is a High Definition Multimedia Interface (HDMI) receiver in a sink device.

* * * * *